Figure 1:
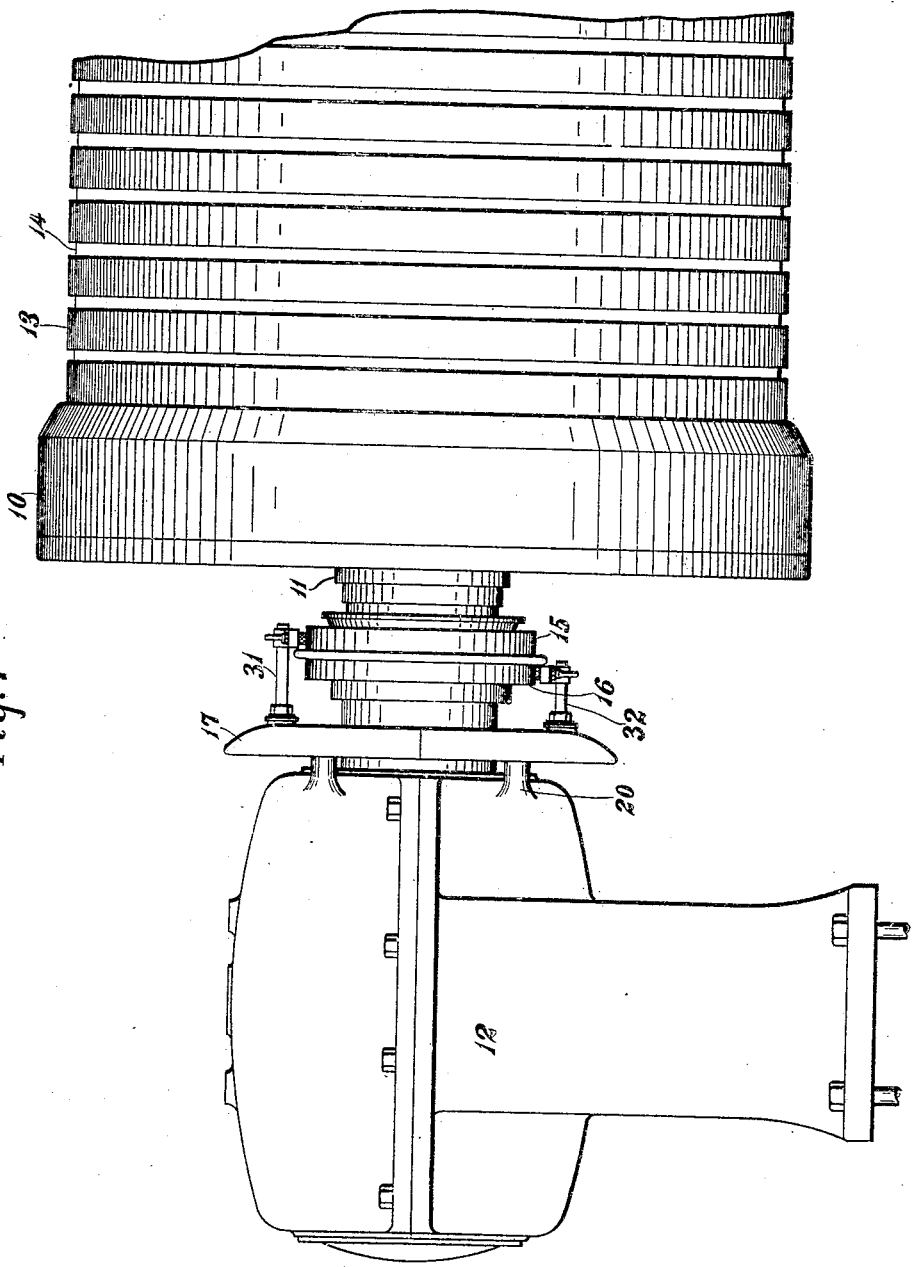

B. A. BEHREND.
DYNAMO MACHINE CONSTRUCTION.
APPLICATION FILED MAY 17, 1906.

933,226.

Patented Sept. 7, 1909.
2 SHEETS—SHEET 1.

WITNESSES
Oliver W. Sharman
Fred J. Kinsey

INVENTOR
Bernard A. Behrend
By
Chas. E. Lord
ATTORNEY

B. A. BEHREND.
DYNAMO MACHINE CONSTRUCTION.
APPLICATION FILED MAY 17, 1906.
933,226.
Patented Sept. 7, 1909.
2 SHEETS—SHEET 2.
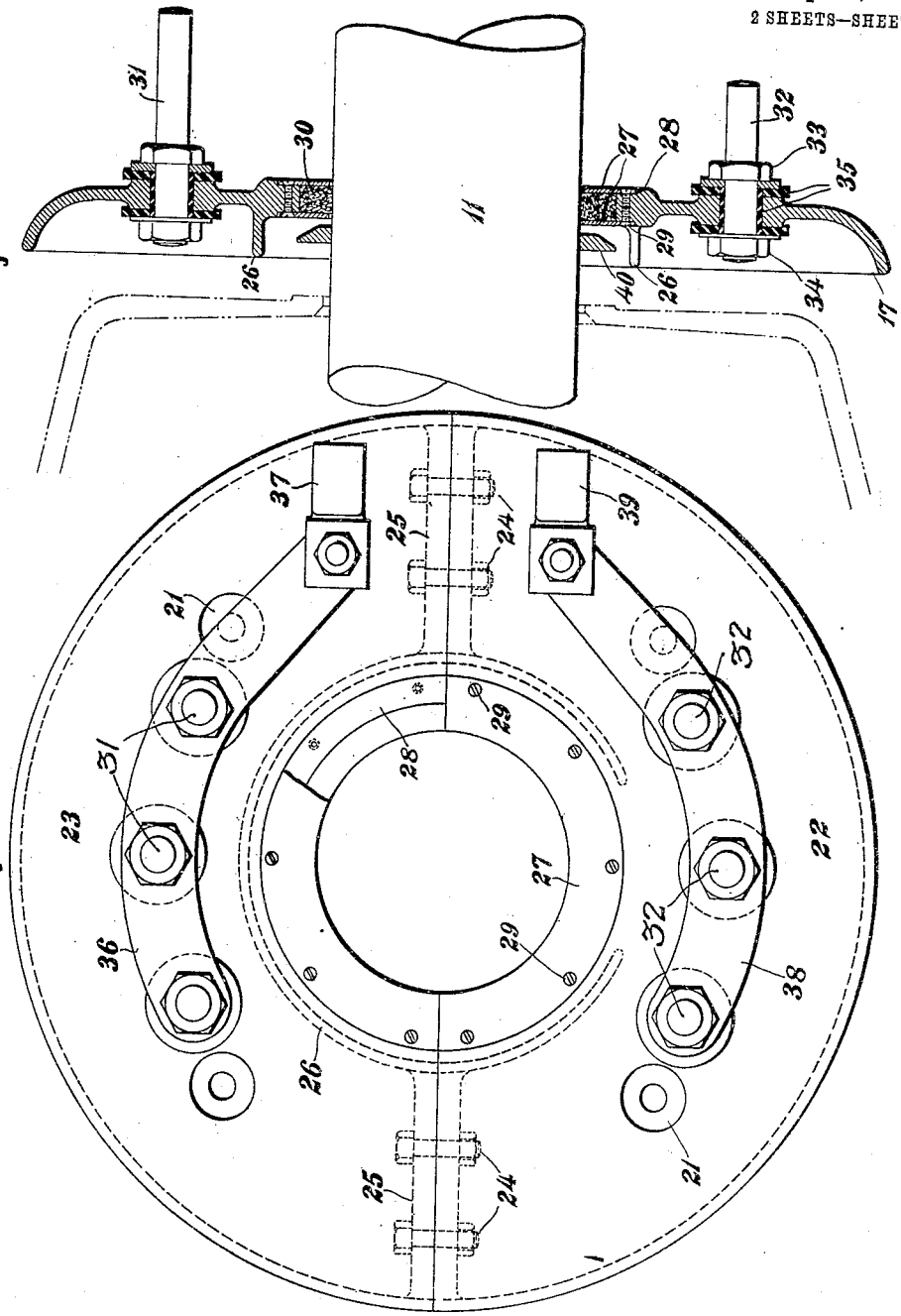
WITNESSES
INVENTOR
Bernard A. Behrend
By
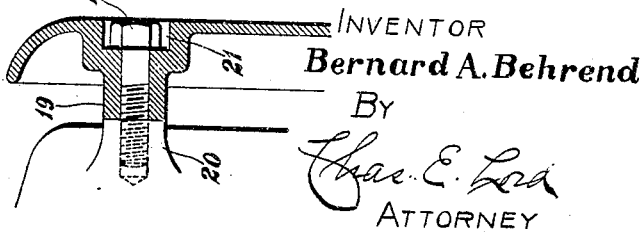
ATTORNEY

UNITED STATES PATENT OFFICE.

BERNARD A. BEHREND, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

DYNAMO-MACHINE CONSTRUCTION.

933,226.  Specification of Letters Patent.  Patented Sept. 7, 1909.

Application filed May 17, 1906. Serial No. 317,291.

*To all whom it may concern:*

Be it known that I, BERNARD A. BEHREND, a citizen of the United States, residing at Norwood, in the county of Hamilton and State of Ohio, have invented certain new and useful Improvements in Dynamo-Machine Construction, of which the following is a full, clear, and exact specification.

My invention relates to dynamo-electric machines and particularly to high speed machines such as turbo-generators although it is not limited in its application to machines of this type.

In many types of dynamo-electric machines the rotary members are provided with axial air passageways through which air is drawn by the fan-like action of the rotors and forced outward into the stators to cool the parts of the rotors and stators. The amount of air thus drawn into the rotor at its ends depends in a great measure on the speed of rotation. In high speed machines such as turbo-generators the volume of air thus drawn into the rotor at its ends and the velocity at which it is forced outward into the stator is enormous. Also in such machines it is necessary in order to maintain the friction as low as possible to provide large bearings and to flood the same with lubricating oil by forced feed.

It has been found that the air drawn into the ends of the rotor passes through or over the bearings in such a manner that a quantity of oil is carried along the shaft in spite of the fact that oil slingers are employed. This oil spreads over the slip rings causing the brushes to make poor contact with the rings, and passes into the rotor and stator impregnating the insulation of the coils and thereby lessening the life of the latter by hastening the decay of the insulation.

The object of my invention is to provide means for preventing the oil from being drawn from the bearings along the shaft and into the rotor by the air currents created by the fan-like action of the rotor.

In carrying out my invention I provide a member between the shaft-bearing and rotor which is so constructed that it serves both as a brush-support or brush-yoke and oil guard.

More specifically considered my invention consists in providing intermediate the shaft-bearing and the rotary field member or rotary armature a circular member on which the brush studs are mounted, which member preferably is dish-shaped and flanged so as to prevent the oil from passing to the rotary member over the outer periphery and preferably consists of two parts for convenience in assembling. The member closely encircles the shaft and is provided in its inner periphery or surface adjacent the shaft with a continuous groove in which is inserted a fibrous or other absorbent material such as waste, which engages the shaft and prevents the oil from passing along the latter.

My invention still further consists in the details of construction and the combinations of elements described in the specification and set forth in the appended claims.

For a better understanding of my invention, reference is had to the accompanying drawings in which—

Figure 1 is an elevation of a portion of a dynamo-electric machine including a shaft-bearing; Fig. 2 is an elevation of a combined brush-yoke and oil-guard, having the brush-studs mounted therein, parts being broken away for the sake of clearness; Fig. 3 is a section of the oil-guard applied to the shaft, a portion of the adjacent bearing being shown in dotted lines; and Fig. 4 is a detail showing the manner of supporting the brush-yoke and oil-guard upon the bearing.

Referring now to the figures of the drawing, I have shown at 10 the rotary-member of a dynamo-electric machine being in this case the rotary field-member of a turbo-alternator. The rotary member is mounted on the shaft 11 which is supported in large bearings, one of which is shown at 12. Although I have, in this case, shown the rotary field-member of a turbo-alternator, it is clear my invention is not limited in its application to this type of dynamo-electric machine but may be used in connection with other types such as direct current machines. The rotary field-member, in this case, consists of a number of disks, or groups of laminæ 13, spaced apart forming circumferential ventilating passageways 14. A rotor of this type is usually provided with a large number of axial air-passageways open at each end, and which communicate with all the circumferential passageways 14 so that at high speed a large volume of air is forced through the passageways 14 into the stator core. As here shown the positive and negative slip rings or collector rings are shown at 15 and 16 respectively. I have in this case shown both rings mounted at one end of the machine, but if desired one ring may be mounted at each end of the machine.

On account of the large volume of air which is drawn into the ends of the machine, it has been found impossible to prevent, by means of the ordinary oil-guards and oil slingers in the shaft bearing, some oil from being drawn from the bearing along the shaft over the slip ring or collector ring and into the cores of the rotary and stationary members. To overcome this difficulty I interpose between one of the bearings and the rotary member, or between each of the bearings and the rotary member, a combined brush-yoke and oil-guard, which serves as an excellent support for the brush-studs, and is very effective for preventing oil from passing from the bearing to the rotary member.

If the slip rings are mounted on the shaft at one end of the machine, one brush-yoke and oil-guard supports both the positive and negative brush studs, as many of each polarity being provided as is desired. In case the slip-rings are mounted at both ends of the machine, one brush-yoke and oil-guard supports the studs on which the positive brushes are mounted and the other brush-yoke and oil-guard supports the studs on which the negative brushes are mounted. In this case, a single oil-guard is shown as supporting both the positive and negative brush studs.

The brush-yoke and oil-guard is shown at 17 and consists of a circular member arranged between the shaft-bearing and slip-rings. This member, as is shown, is approximately the same as or slightly larger in diameter than is the bearing-housing, and is preferably supported on the latter by bolts 18, the bolts passing through lugs 19 on the member 17 and into properly arranged lugs 20 on the bearing-housing. Recesses 21 (shown in Figs. 3 and 4) are provided for receiving the heads of the bolts. The brush-support and oil guard 17 may consist of a single plate, but is preferably made from two semi-circular plates 22 and 23 which are held together by bolts 24 passing through flanges 25. Member 17 is preferably dish-shape or concave toward the bearing, and is also provided with a flange 26 which extends almost entirely around the member so that the oil will be prevented from being drawn over the outer periphery of the member.

As shown most clearly in Figs. 2 and 3, the brush-support and oil-guard completely encircles the shaft and is closely arranged thereto. The plates 22 and 23 are provided on each side at their inner periphery with semi-circular strips or plates 27 engaging suitable grooves 28, and held in position by screws 29. The strips 27 approach very closely to the shaft 11, a very small clearance only being provided. Thus it is seen that when the parts are assembled, a continuous groove is provided at the inner surface or periphery of the member 17. In this groove is placed fibrous or other oil absorbing material 30, such as waste, to intercept the oil passing from the bearing.

Mounted in the brush-yoke and oil-guard are two sets of brush-studs for supporting the brushes of both polarities, the studs for the brushes of one polarity being shown at 31, and the studs for the brushes of the opposite polarity being shown at 32. In this case there are three brush studs in each set, but it is clear that the number can be increased or decreased as desired. The studs pass through the plates and are held in position by nuts 33 and 34, suitable insulation 35 being interposed between the studs and the plates. A connector 36, provided with a terminal 37, joins the studs of one polarity and is held in position by the nuts 33, and a connector 38, provided with a terminal 39, joins the studs of the opposite polarity.

Mounted on the shaft under the overhanging flange 26 is an oil slinger 40, the purpose of which is to intercept as much as possible of the oil which passes from the bearing along the shaft. The oil from the oil slinger 40 is caught by the flange 26 from which the oil can readily escape at the bottom. By making the member 17 concave or dish-shaped, oil is less liable to be carried over its outer periphery to the rotor. All the oil which is not intercepted by the oil-slinger 40 is absorbed by the material 30 in the groove in the inner periphery of the member 17, so that practically no oil whatever passes to the slip rings or rotor.

I do not wish to be confined to the exact details of construction shown, but aim in my claims to cover all modifications which do not involve a departure from the spirit and scope of my invention.

What I claim as new and desire to secure by Letters Patent is:—

1. In a dynamo-electric machine, a shaft, a rotary member secured thereto, a combined brush-yoke and oil-guard consisting of a circular member closely encircling the shaft, said member having a groove in its inner surface, said groove containing a fibrous or other absorbent material, and a brush stud secured to said member.

2. In a dynamo-electric machine, a shaft, a rotary member secured thereto, a combined brush-yoke and oil-guard comprising two substantially semi-circular members secured to each other, said members closely surrounding the shaft and having a groove in their inner surfaces and an absorbent material in said groove and in contact with the shaft.

3. In a dynamo-electric machine, a shaft, a rotary member secured thereto, a shaft-bearing, a combined brush-yoke and oil-guard consisting of a circular member secured to said bearing, said member closely surrounding the shaft and having a groove in its surface adjacent the shaft, a fibrous or other absorbent material in said groove and engaging the shaft, and one or more brush-studs secured to said member.

4. In a dynamo-electric machine, a shaft, a rotary member secured thereto, a shaft-bearing, a combined brush-yoke and oil-guard comprising two semi-circular plates secured to said bearing, said brush-yoke and oil-guard closely surrounding the shaft and having a groove in its inner periphery, and an absorbent material in the groove and in contact with the shaft, and one or more brush studs secured to said plates.

5. In a dynamo-electric machine, a shaft, a rotor secured thereto, a shaft-bearing, a circular member concave toward the bearing interposed between the latter and the rotor, said member consisting of two substantially semi-circular plates secured to each other and to the bearing, and having a groove in its inner periphery, an absorbent material in said groove, and a plurality of brush-studs secured to said member.

6. In a dynamo-electric machine, a rotary member mounted on a shaft, a bearing for the shaft, a stationary brush-supporting member separate from said bearing, said member having a groove in its inner surface, and absorbent material located in said groove and in contact with said shaft.

In testimony whereof I affix my signature, in the presence of two witnesses.

BERNARD A. BEHREND.

Witnesses:
ARTHUR F. KWIS,
FRED J. KINSEY.